US009454260B2

(12) United States Patent
Campbell et al.

(10) Patent No.: US 9,454,260 B2
(45) Date of Patent: Sep. 27, 2016

(54) SYSTEM AND METHOD FOR ENABLING MULTI-DISPLAY INPUT (75) Inventors: Robert Campbell, Cupertino, CA (US); John P. McCarthy, Pleasanton, CA (US); Bradley Neal Suggs, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 121 days.

(21) Appl. No.: 13/809,449

(22) PCT Filed: Aug. 4, 2010

(86) PCT No.: PCT/US2010/044416
§ 371 (c)(1),
(2), (4) Date: Jan. 10, 2013

(87) PCT Pub. No.: WO2012/018328
PCT Pub. Date: Feb. 9, 2012

(65) Prior Publication Data
US 2013/0106792 A1    May 2, 2013

(51) Int. Cl.
*G06F 3/042*    (2006.01)
*G06F 3/01*    (2006.01)
*G06F 3/03*    (2006.01)
*G06F 3/14*    (2006.01)

(52) U.S. Cl.
CPC ............. *G06F 3/0421* (2013.01); *G06F 3/017* (2013.01); *G06F 3/0304* (2013.01); *G06F 3/0428* (2013.01); *G06F 3/1423* (2013.01); *G09G 2354/00* (2013.01)

(58) Field of Classification Search
CPC .. G06F 3/0412; G06F 3/0416; G06F 3/0421; G06F 2203/04108; G06F 3/1423; G06F 3/147; G06F 3/0425; G09G 2300/02; G09G 2300/026
USPC ............................................ 345/1.1, 1.2, 1.3
See application file for complete search history.

(56) References Cited

U.S. PATENT DOCUMENTS 5,761,485 A * 6/1998 Munyan ........................ 715/839
7,561,146 B1 * 7/2009 Hotelling .............. G06F 3/0304
345/168

(Continued)

FOREIGN PATENT DOCUMENTS

CN    101630213 A    1/2010
CN    101776816 A    7/2010

(Continued)

OTHER PUBLICATIONS

PCT; "Notification of Transmittal of the International Search Report and The Written Opinion of the International Searching Authority, or the Declaration"; cited in PCT/US2010/044416; mailed May 25, 2011; 8 pages.

*Primary Examiner* — Jason Mandeville
(74) *Attorney, Agent, or Firm* — HP Inc Patent Department (57) ABSTRACT

Embodiments of the present invention disclose a system and method for enabling multi-display input. According to one embodiment, the presence of an object is detected within a display area of a first display panel or a second display panel via at least one optical sensor coupled to a processor. Positional data of the object is received from the optical sensor, and a control operation associated with either the first display or second display panel is determined based on the positional data received from the optical sensor.

7 Claims, 8 Drawing Sheets

(56) References Cited

U.S. PATENT DOCUMENTS

| | | |
|---|---|---|
| 7,676,767 B2 | 3/2010 | Hofmeister et al. |
| 8,274,496 B2 * | 9/2012 | Ung et al. .................... 345/176 |
| 8,382,295 B1 * | 2/2013 | Kim et al. .................... 353/119 |
| 8,692,768 B2 * | 4/2014 | Chtchetinine et al. ....... 345/157 |
| 2002/0126102 A1 | 9/2002 | Redmayne |
| 2003/0095105 A1 | 5/2003 | Vaananen |
| 2007/0085759 A1 | 4/2007 | Lee et al. |
| 2008/0122805 A1 * | 5/2008 | Smith et al. .................. 345/175 |
| 2009/0066728 A1 | 3/2009 | Ording |
| 2009/0278806 A1 | 11/2009 | Duarte et al. |
| 2009/0322689 A1 | 12/2009 | Kwong et al. |
| 2010/0001973 A1 | 1/2010 | Hotelling et al. |
| 2010/0079355 A1 | 4/2010 | Kilpatrick et al. |
| 2010/0171716 A1 | 7/2010 | Ikeda et al. |
| 2010/0328447 A1 * | 12/2010 | Watson ................. G06F 3/1446 348/135 |

FOREIGN PATENT DOCUMENTS

| | | |
|---|---|---|
| CN | 101779185 A | 7/2010 |
| KR | 10-2004-0040597 A | 5/2004 |
| KR | 10-2009-0102815 A | 9/2009 |

* cited by examiner

SYSTEM AND METHOD FOR ENABLING MULTI-DISPLAY INPUT

BACKGROUND

Providing efficient and intuitive interaction between a computer system and users thereof is essential for delivering an engaging and enjoyable user-experience. Today, most computer systems include a keyboard for allowing a user to manually input information into the computer system, and a mouse for selecting or highlighting items shown on an associated display unit. As computer systems have grown in popularity, however, alternate input and interaction systems have been developed. For example, touch-based, or touchscreen, computer systems allow a user to physically touch the display unit and have that touch registered as an input at the particular touch location, thereby enabling a user to interact physically with objects shown on the display.

BRIEF DESCRIPTION OF THE DRAWINGS

The features and advantages of the inventions as well as additional features and advantages thereof will be more clearly understood hereinafter as a result of a detailed description of particular embodiments of the invention when taken in conjunction with the following drawings in which:

FIG. 5A illustrates a three-dimensional perspective view of the multi-display system and an operating user thereof, while

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" and "e.g." are used in an open-ended fashion, and thus should be interpreted to mean "including, but not limited to . . . ". The term "couple" or "couples" is intended to mean either an indirect or direct connection. Thus, if a first component couples to a second component, that connection may be through a direct electrical connection, or through an indirect electrical connection via other components and connections, such as an optical electrical connection or wireless electrical connection. Furthermore, the term "system" refers to a collection of two or more hardware and/or software components, and may be used to refer to an electronic device or devices, or a sub-system thereof.

DETAILED DESCRIPTION OF THE INVENTION

The following discussion is directed to various embodiments. Although particular embodiments are described and depicted, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Generally, in order to provide touch functionality for a computing system, an optical sensor must be included, or mounted on the display of the system. However, providing these optical sensors for multiple adjacent displays can lead to excessive manufacturing and installation costs. As such, a more cost effective and intuitive solution is needed.

Embodiments of the present invention disclose a system and method for enabling multi-display touch input. According to one embodiment, by utilizing an optical touch sensor capable of detecting objects beyond the edge of the display in which it is mounted, objects in front of a second display may be detected. That is, placing a non-touch display adjacent to the touch-enabled display having such an optical sensor can allow the optical sensor to detect touches on the non-touch display. Accordingly, embodiments of the present invention enable a single touch sensor to provide touch functionality for multiple adjacent displays so as to reduce the overall costs of implementation.

Figure 1:
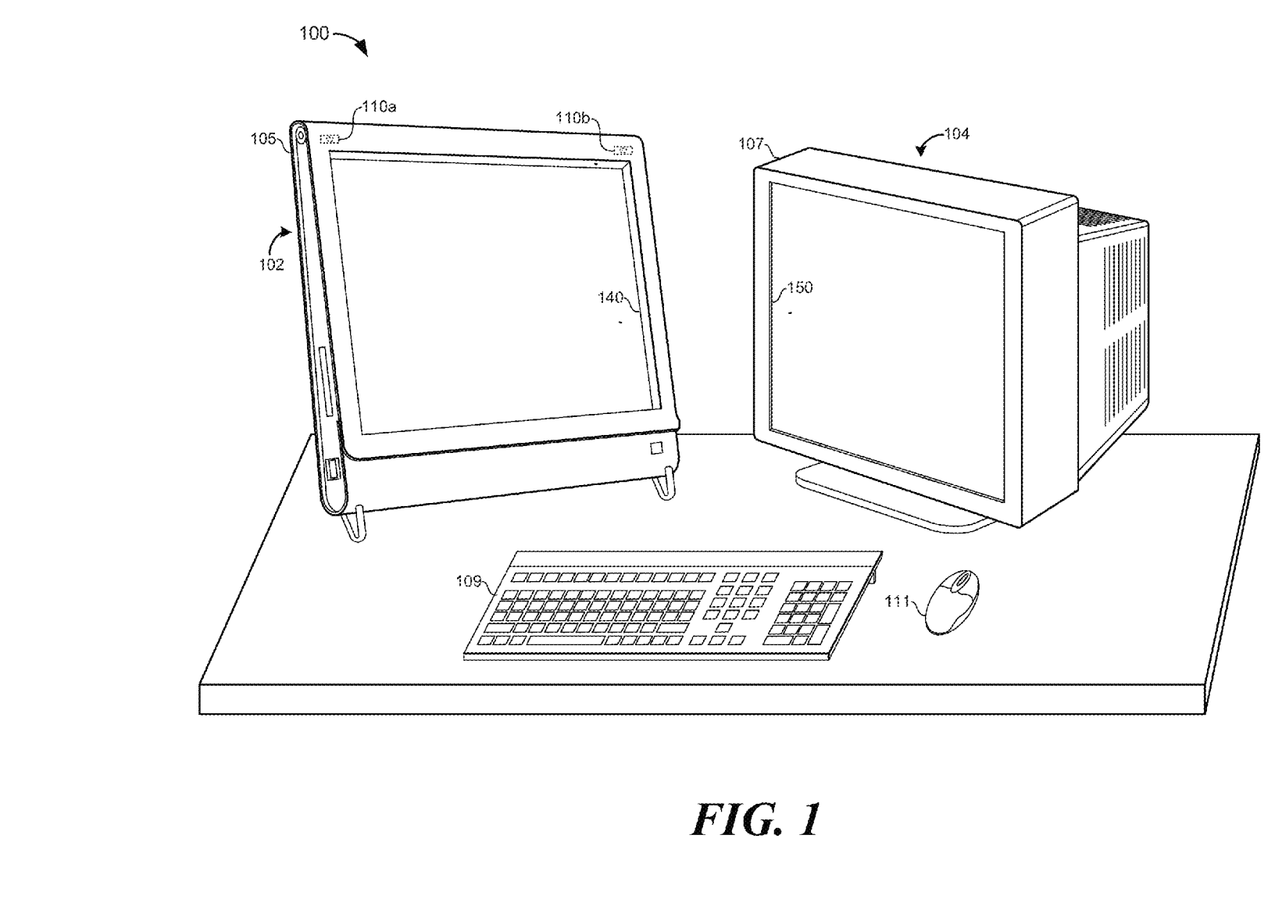
FIG. 1 is a three-dimensional perspective view of a multi-display computing environment according to an embodiment of the present invention.

Referring now in more detail to the drawings in which like numerals identify corresponding parts throughout the views, FIG. 1 is a three-dimensional perspective view of a multi-display computing environment according to an embodiment of the present invention. As shown here, the multi-display environment 100 includes a first computing system 102 and a second computing system 104. The first computing system 102 includes a housing for enclosing the processing components and a display panel, or display unit 140. Similarly, the second computing system 102 includes a housing 107 for encompassing a display panel 150. Additionally, the first computing system 102 includes a first and second optical sensor 110a and 110b. These optical sensors may represent a two-dimensional optical sensor configured to detect shadow detail of an approaching object, a three-dimensional sensor configured to produce a three-dimensional depth map of an approaching object, or similar image capturing device. Furthermore, display panels 140 and 150 may be a liquid crystal display (LCD) panel, a plasma display, a cathode ray tube (CRT), an OLED or a projection display such as digital light processing (DLP), for example. The system 100 also includes input devices such as a keyboard 120 and a mouse 125 for text entry, navigating the user interface, and manipulating data by a user for example.

In one embodiment, the display panel 140 may include a transparent layer in front of the display panel 140. The front side of display panels 140 and 150 is the surface that displays an image and the back of the panel is opposite the front. The optical sensors 110a and 110b can be on the same side of the transparent layer as the display panel 140 in order to protect the optical sensors from contaminates. In an alternative embodiment, the optical sensors 110a and 110b may be in front of the transparent layer. The transparent layer can be glass, plastic, or another transparent material. According to one embodiment, the optical sensors 110a and 110b are mounted in an area of the housing 105 that is outside of the perimeter of the display panel 140 so as to ensure that the clarity of the transparent layer is not reduced by the optical sensors.

Figure 2:
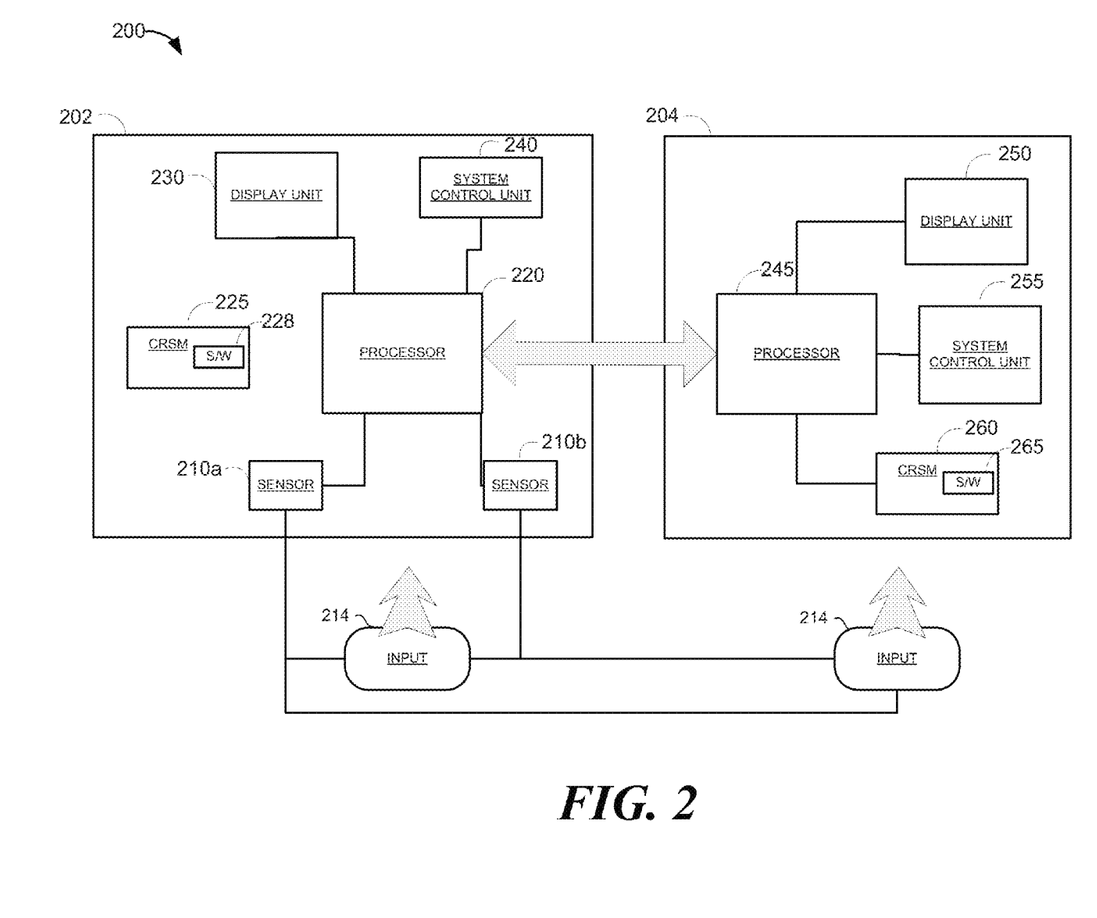
FIG. 2 is a simplified block diagram of the multi-display system according to an embodiment of the present invention.

FIG. 2 is a simplified block diagram of the multi-display system according to an embodiment of the present invention. As shown in this exemplary embodiment, the system 200 includes a first computing system 202 and a second computing system 204. The first computing system 202 includes a processor 220 coupled to a display unit 230, a system control unit 240, a computer-readable storage medium 225, and optical sensors 210a and 210b configured to capture input 214, which is positional data related to an object in front of the display unit associated with either computing system 202 or 204. The second computing system 204 includes a processor 245 coupled to a second display unit 250, a system control unit 255, and a computer-readable storage medium 225. Optical sensors 210a and 210b are configured to detect positional data of an object within the display area of both the first computing system 202 and the second computing system 204. In one embodiment, processors 220 and 245 represent a central processing unit configured to execute program instructions. Furthermore and according to one example, processor 220 of computer system 202 is coupled to processor 245 of computer system 204 via a wired or wireless connection. Accordingly, computer system 202 may communicate with computer system 204 and transmit information such as positional data associated with an object or input 214 detected by one of the optical sensors 210a and 210b for example.

Display unit 230 represents a touchsensitive display configured to display images and a graphical user interface for enabling interaction between the user and the computer system, while display unit 250 represents a non-touchsensitive electronic visual display such as a generic cathode ray tube (CRT) monitor. Storage mediums 225 and 260 represent volatile storage (e.g. random access memory), non-volatile store (e.g. hard disk drive, read-only memory, compact disc read only memory, flash storage, etc.), or combinations thereof. In one embodiment, system control units 240 and 255 may represent an application program or user interface control module configured to receive and process positional data of a detected object. Furthermore, storage mediums 225 and 255 of computer system 202 and 204 respectively, includes software 228 that is executable by processor 220 and, that when executed, causes the processor 220 to perform some or all of the functionality described herein.

Figure 3:
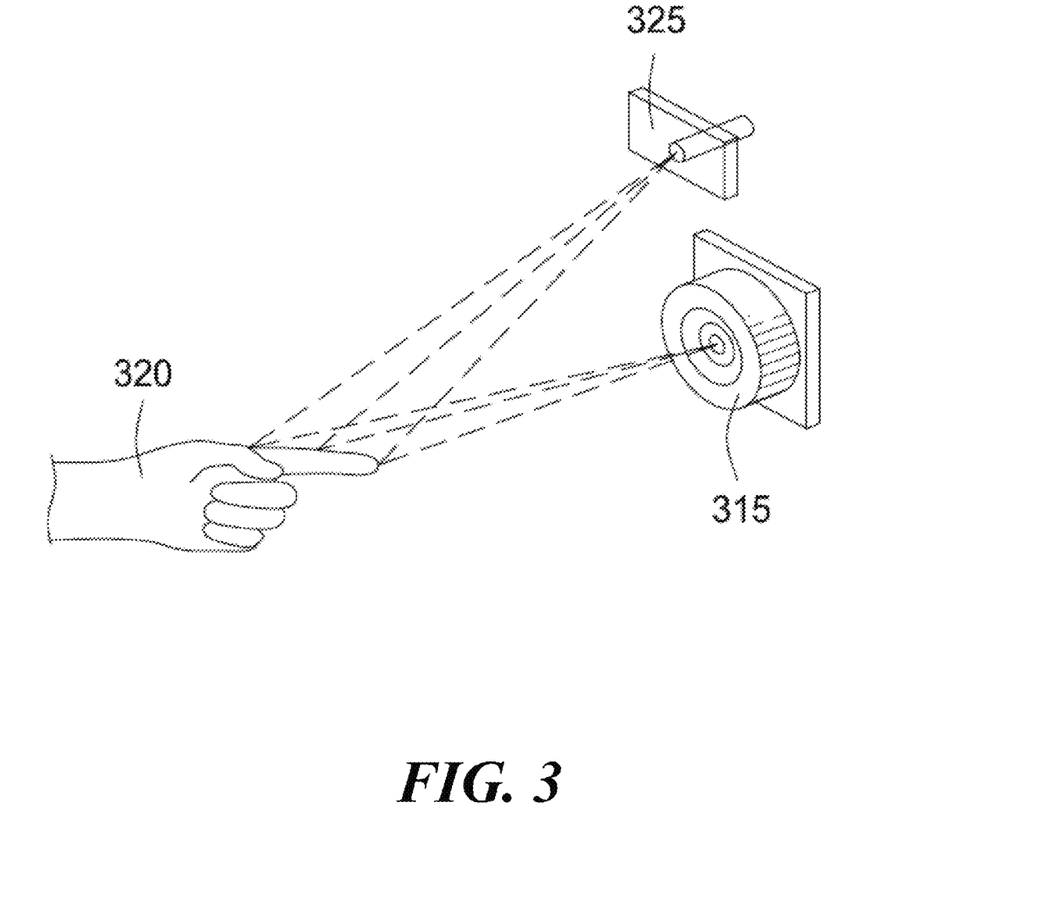
FIG. 3 depicts an exemplary three-dimensional optical sensor according to an embodiment of the invention.

FIG. 3 depicts an exemplary three-dimensional optical sensor 315 according to an embodiment of the invention. The three-dimensional optical sensor 315 can receive light from a source 325 reflected from an object 320. The light source 325 may be an infrared light or a laser light source for example, that emits light and is invisible to the user. The light source 325 can be in any position relative to the three-dimensional optical sensor 315 that allows the light to reflect off the object 320 and be captured by the three-dimensional optical sensor 315. The infrared light can reflect from an object 320 that may be the user's hand in one embodiment, and is captured by the three-dimensional optical sensor 315. An object in a three-dimensional image is mapped to different planes giving a Z-order, order in distance, for each object. The Z-order can enable a computer program to distinguish the foreground objects from the background and can enable a computer program to determine the distance the object is from the display.

The two-dimensional optical sensor of one embodiment may use a triangulation based method that involves intensive image processing to approximate the depth of objects. Two-dimensional image processing generally uses data from a sensor and processes the data to generate data that is normally not available from a three-dimensional sensor. In one example, color and intensive image processing may not be used for a three-dimensional sensor because the data from the three-dimensional sensor includes depth data. For example, the image processing for a time of flight using a three-dimensional optical sensor may involve a simple table-lookup to map the sensor reading to the distance of an object from the display. The time of flight sensor determines the depth from the sensor of an object from the time that it takes for light to travel from a known source, reflect from an abject and return to the three-dimensional optical sensor.

In an alternative embodiment, the light source can emit structured light that is the projection of a light pattern such as a plane, grid, or more complex shape at a known angle onto an object. The way that the light pattern deforms when striking surfaces allows vision systems to calculate the depth and surface information of the objects in the scene. Integral Imaging is a technique which provides a fall parallax stereoscopic view. To record the information of an object, a micro lens array in conjunction with a high resolution optical sensor is used. Due to a different position of each micro lens with respect to the imaged object, multiple perspectives of the object can be imaged onto an optical sensor. The recorded image that contains elemental images from each micro lens can be electronically transferred and then reconstructed in image processing. In some embodiments the integral imaging lenses can have different focal lengths and the objects depth is determined based on if the object is in focus, a focus sensor, or out of focus, a defocus sensor. However, embodiments of the present invention are not limited to any particular type of two or three-dimensional optical sensor.

Figure 4A:
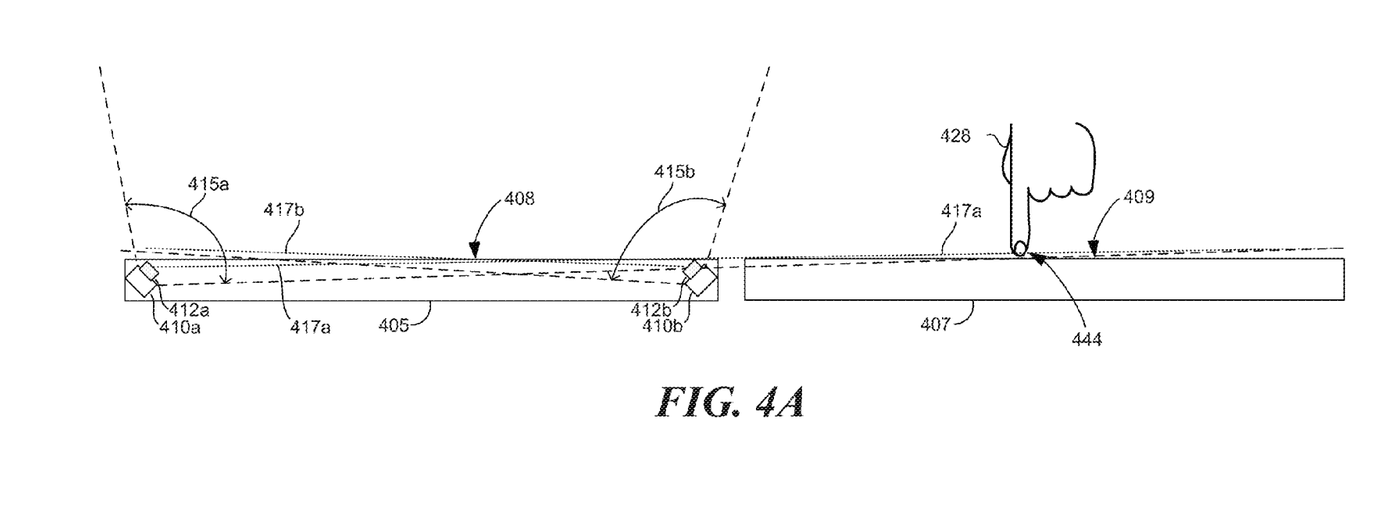
FIGS. 4A and 4B are top down perspective views of the multi-display system according to an embodiment of the present invention
Figure 4B:
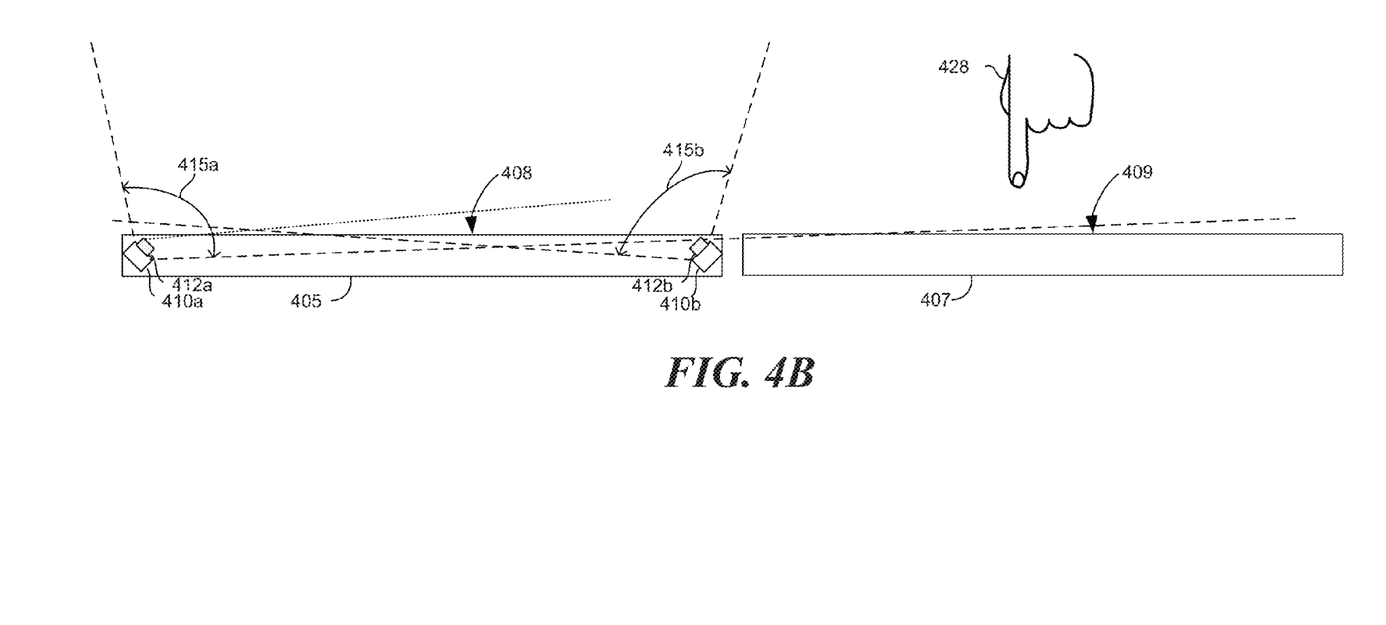

FIGS. 4A and 4B are top down perspective views of the multi-display system according to an embodiment of the present invention. The example shown in FIG. 4A represents a multi-display system in a two-dimensional touchscreen environment. As shown here, a first display panel 405 and a second display panel 407 are positioned horizontally-adjacent to one another. Display panel 405 includes two optical sensors 410a and 410b, and two light emitting devices 412a and 412b. According to the present embodiment, light emitting devices 412a and 412b project light sources 417a and 417b respectively. More specifically, the light emitters 412a and 412b projects a plane of infrared light 417a and 417b that covers the front surface 407 of the first display panel 405 in addition to the front surface 409 of the second display panel 407. Furthermore, optical sensors 410a and 410b include respective fields of views 415a and 415b configured to detect and capture disruptions in either light source 417a or 417b caused by an input object or device approaching either front display surface 408 or 409. The object may be a physical object such as a finger or stylus that is to come into contact with the display surface 409 as shown in FIG. 4A. Still further, the area immediately facing and within a programmable distance (e.g. one meter) of front surfaces 408 and 409 represents the display area, or the area in view of at least one optical sensor of an associated computing system. More particularly, optical sensors 410a and 410 are configured to detect presence of an object (within a display area) for both the first display panel 405 and the second display panel 407.

More particularly, an object such as a user's hand 428 may approach the second display panel 407 and cause a disruption in light source 417a at position 444 as shown in FIG. 4A. When the object or input 428 disrupts the plane of either light source 417a or 417b, the disruption is accordingly detected by one of the optical sensors 410a or 410b. Thereafter, a processing controller receives positional or disruption information from the optical sensors in the form of a shadow data where the disrupted area may appear black for example. Such positional information informs the processer of the location of the disruption and thus the position of the desired input from the user.

FIG. 4B depicts a multi-display system utilizing three-dimensional optical sensors. As shown here, the first display panel 405, which is positioned immediately adjacent to the second display panel 407, includes two three-dimensional optical sensors 410a and 410b configured to report a three-dimensional depth map to a processor, and two light emitting devices 412a and 412b. The three-dimensional optical sensors 410a and 410b can determine the depth of an object located within its respective field of view 415a and 415b. Moreover, the acquired depth map changes over time as an object moves in the respective field of view 415a of optical sensor 410a, or within the field of view 415b of optical sensor 415b. The depth of the object may be used in one embodiment to determine if the object is in contact with the front surface side 408 or 409 of either display panel 405 or 407, or if the object is within a programmed distance (i.e. display area) of the display panel but not actually contacting the front side of either display panel 405 or 407. For example, the object 428 may be a user's hand and finger approaching the front side 409 of the display panel 407. That is, optical sensors 410a and 410b are configured to capture positional data of an object for both the first display panel 405 and the second display panel 407.

In accordance with one example of the present invention, optical sensors 410a and 410b are positioned at top most corners around the perimeter of the display panel 405 such that each field of view 415a and 415b includes the areas above and surrounding the display panel 409. As shown here, the field of view 415a afforded from optical sensor 410a extends beyond the front surface 408 of the first display panel 405 and includes the front surface 409 of the second display panel 407. Accordingly, an object such as a user's hand for example, may be detected and any associated motions around the perimeter and in front of either display panel 405 or 407 can be accurately interpreted by the processor coupled to optical sensors 410a and 410b.

Figure 5A:
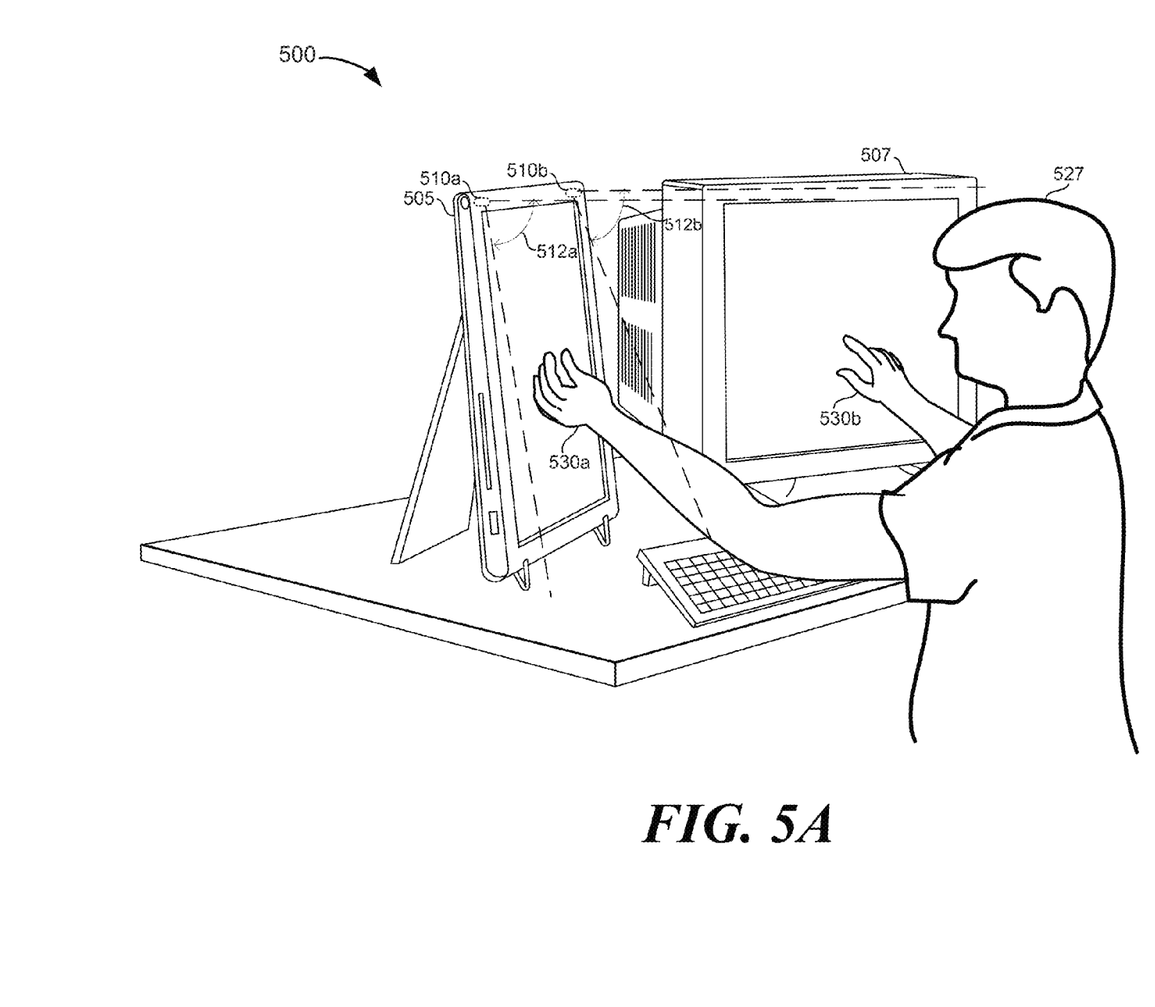
Figure 5B:
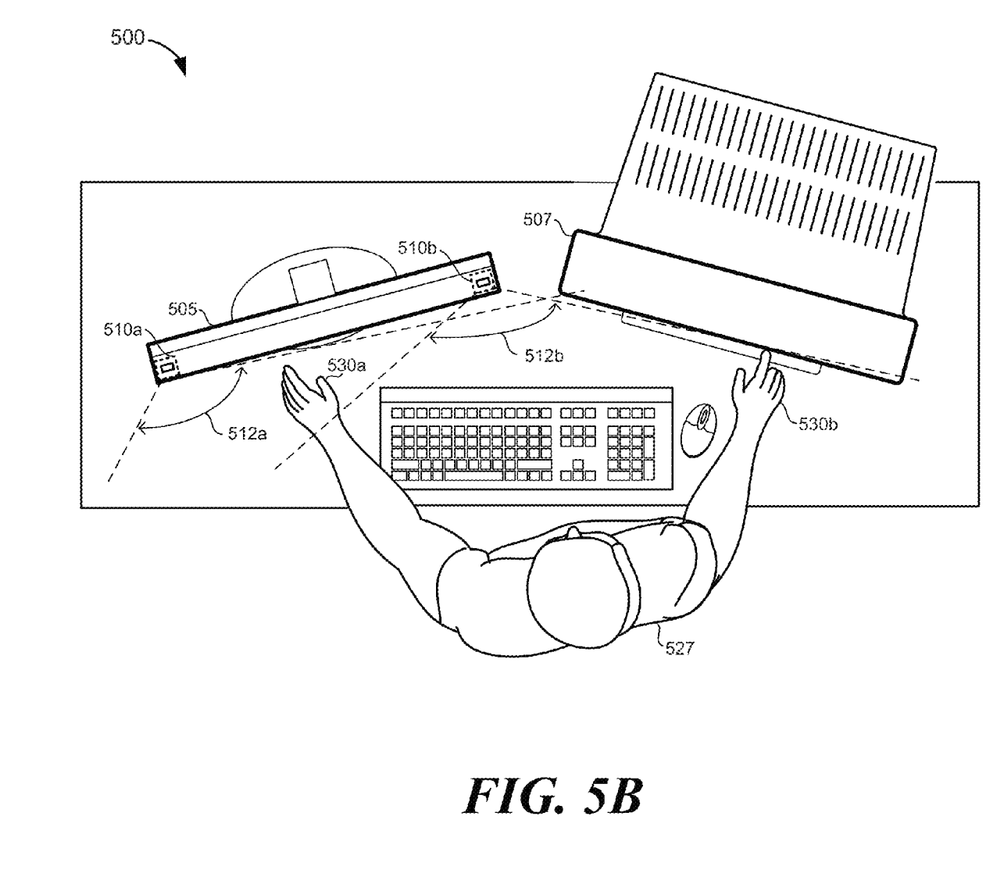
FIG. 5B illustrates a top down perspective view of the multi-display system and an operating user thereof according to an embodiment of the present invention.

FIG. 5A illustrates a three-dimensional perspective view of the multi-display system and an operating user thereof, while FIG. 5B illustrates a top down perspective view of the multi-display system and an operating user thereof according to an embodiment of the present invention. In the present example, multi-display environment 500 includes a user 527 operating a first computing system 505 and a second computing system 507. As mentioned with reference to the previous examples, the first computing system includes optical sensors 510a and 510b for enabling touch functionality, while the second computing system 507 is manufactured without optical sensors. Furthermore, optical sensors 510a and 510b are each configured to have a field of view 512a and 512b respectively for capturing touch or gesture input from an object such as user's hands 530a and 530b for example. Moreover, as shown in the top down perspective view of FIG. 5B, the first computing system 505 may be placed adjacent and at a small angle with respect to the second computing system 507. Such placement may allow the optical sensor 510b to have a field of view 512b that consistently captures an object within the display area, or front surface side area, of the second computing system 507. For example, field of view 512a enables optical sensor 510a to capture positional data associated with a gesture input caused by the user 527 waiving their left hand 530a within the display area of the first computing system 505. Similarly, field of view 512b enables optical sensor 510b to capture positional data associated with a touch input caused by the user 527 touching the front surface (i.e. display area) of the second computing system 507 with their left hand 530b.

Figure 6:
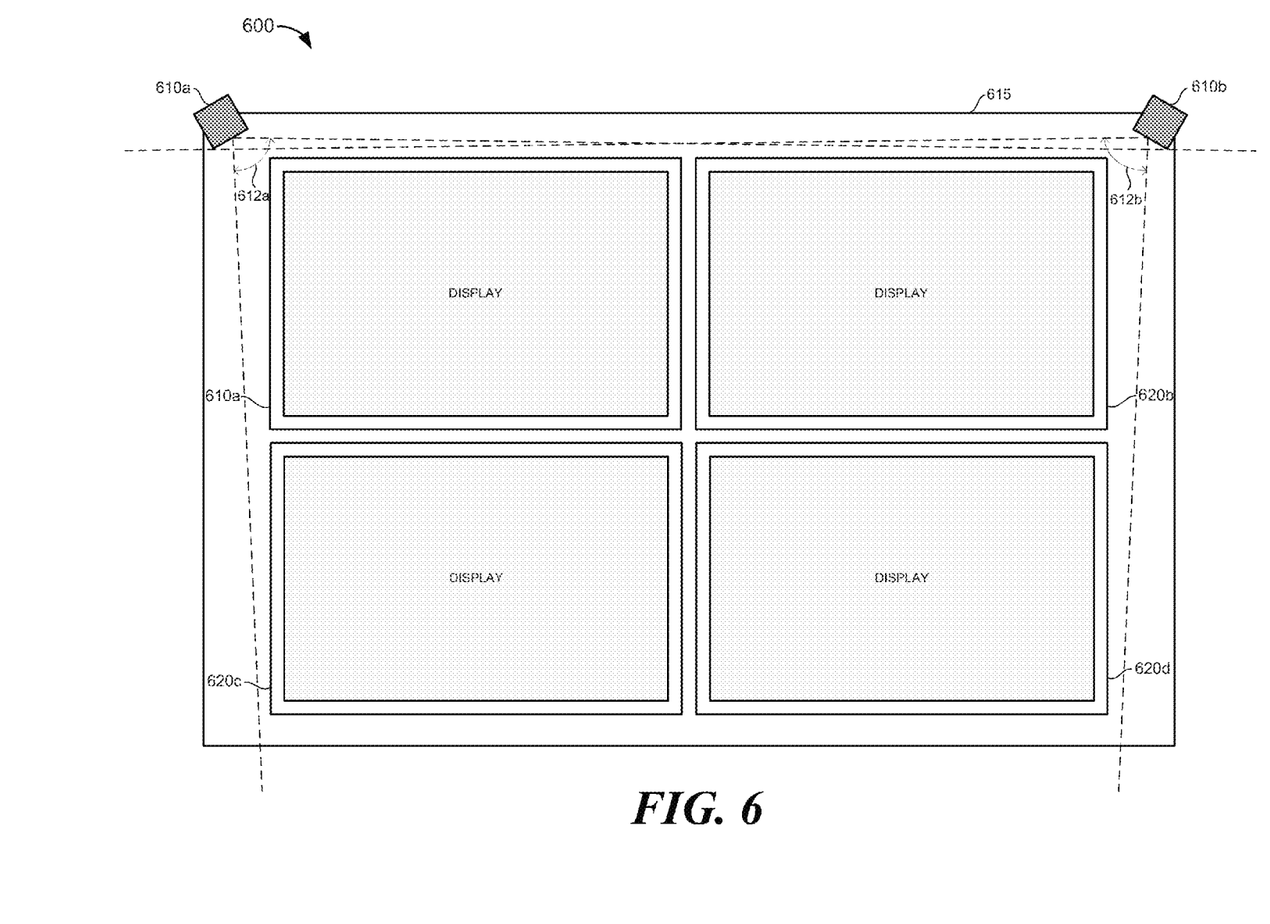
FIG. 6 illustrates yet another operating environment of the multi-display system according to an embodiment of the present invention.

FIG. 6 illustrates yet another operating environment of the multi-display system according to an embodiment of the present invention. As shown here, the multi-display system 600 includes four adjacent display panels 620a-620d and two optical sensors 610a and 610b positioned around the outer perimeter of display panel 620a and 620b respectively. More particularly, optical sensors 610a and 610b are coupled to a processor and positioned at upper corners of a mounting surface 615 which may be a larger display (e.g. projector screen), a wall, or other vertically-rising obstruction. Furthermore, optical sensors 610a and 610b may be physically separated devices or connected to one or more of the display panels 620a-620d. As referenced in the previous examples, optical sensors 610a and 610b may represent either a two-dimensional or three-dimensional optical sensor and include respective fields of views 612a and 612b. Using one of the methods described above, optical sensors 610a and 610b are capable of detecting objects or inputs such as a gesture or touch input from a user when the object or input is within a display area of any display panel 620a-620d.

Figure 7:
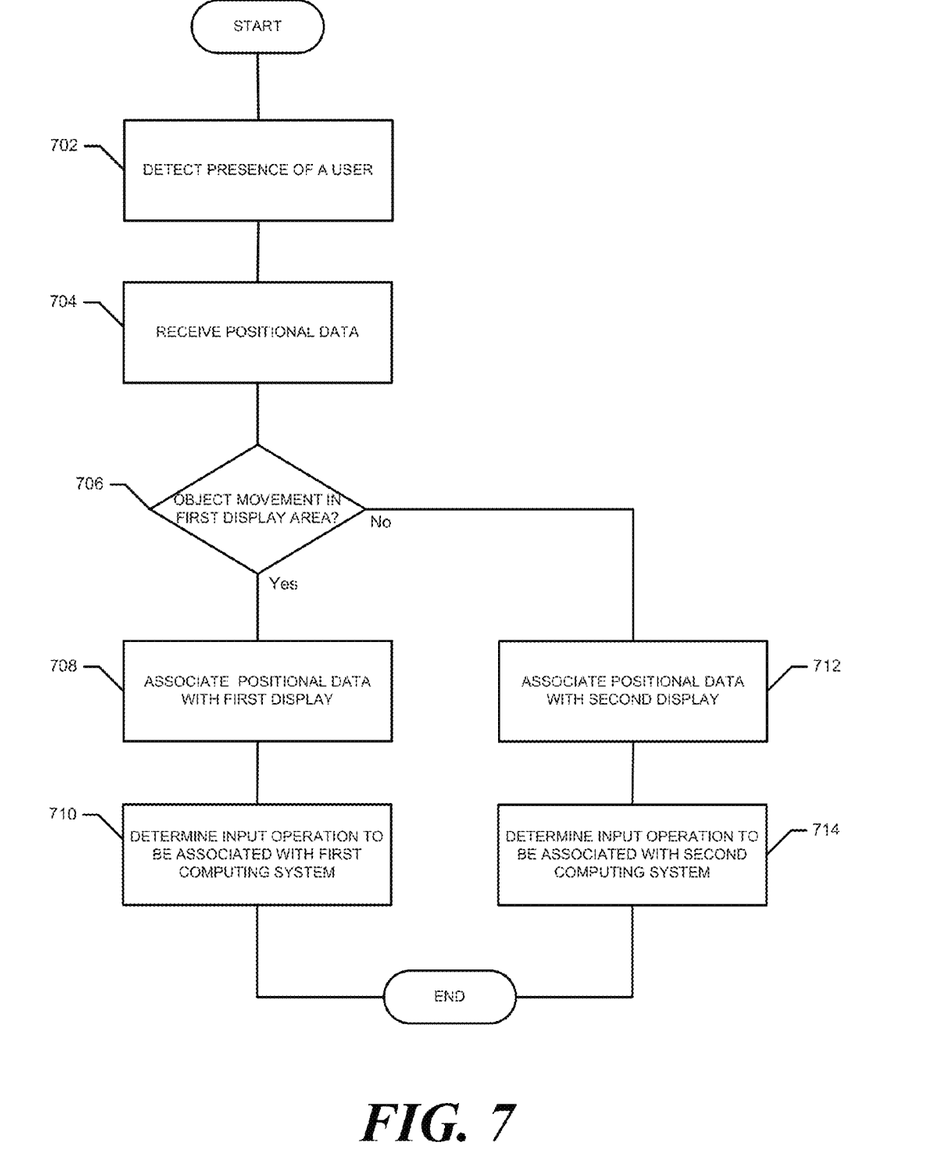
FIG. 7 illustrates the processing steps for the enabling multi-display touch and gesture input according to an embodiment of the present invention.

FIG. 7 illustrates the processing steps for the enabling multi-display touch input according to an embodiment of the present invention. In step 702, the optical sensor detects the presence of a user operating either the first or second computing system. This detection will occur when positional information such as shadow data in an environment implementing two-dimensional optical sensors, or depth map data in an environment implementing at least one three-dimensional sensor, is captured by the optical sensor. Next, in step 704, the captured positional information is sent to and received by the processor coupled to the optical sensor. Thereafter, the processor determines if the captured data is associated with the display area of the first or second computing system in step 706. If the processor determines that the positional information was captured within the display area of the first computing system, then in step 708, the positional information is associated with or assigned to the first computing system. Based on the positional information, in step 710 the processor determines an input or control operation to be executed by the first computing system. However, if the processor determines the positional information was captured within the display area of the second computing system, then in step 712, the positional information is associated with or assigned to the second computing system. That is, the processor is calibrated to determine and assign which display panel an input is associated with. Next, by utilizing the captured positional information the processor can determine an input or control operation to be executed by the second computing system in step 714. For example, an input or control operation may be to scroll the displayed page up or down based on a flapping hand gesture by a user, or a select and drag operation in the case of a user touching the display screen with one finger and moving that finger around the display.

Embodiments of the present invention disclose a system and method for enabling multi-display gesture and touch input. More particularly, optical sensors associated with the display of one computing system are configured to capture and analyze touch-related input directed towards an adjacent second computing system that is without an optical sensor. As a result, touch functionality may be provided for multiple adjacent displays having only a single optical sensor, thereby simplifying implementation of touchscreen computing while also reducing associated manufacturing costs.

Furthermore, while the invention has been described with respect to exemplary embodiments, one skilled in the art will recognize that numerous modifications are possible. For example, although particular embodiments depict a cathode ray tube (CRT) computer as the non-touch enabled computer system, the invention is not limited thereto. For example, the second computing system and display may be a notebook computer, netbook, a virtual keyboard display from a portable projector, or any other display configured to display graphics or objects to an operating user.

Furthermore, although an all-in-one computer is depicted as the representative touch-sensitive display, the invention is not limited thereto. For example, a tablet personal computer, smartphone, or any other touch-enabled display that is coupled to a processer and includes at least one optical sensor may be utilized in accordance with embodiments of the present invention. Thus, although the invention has been described with respect to exemplary embodiments, it will be appreciated that the invention is intended to cover all modifications and equivalents within the scope of the following claims.

What is claimed is:

1. A method comprising:
    detecting, via two or more optical sensors coupled to a processor and disposed on a first electronic display panel, the first electronic display panel and the processor being coupled to a first computing system, an object within fields of view of the optical sensors, wherein the fields of view include a first display area and a second display area, wherein the first display area is immediately facing and within a programmed distance from the first electronic display panel, wherein the second display area is immediately facing and within the programmed distance from a second electronic display panel, the second electronic display panel is physically separated from the first electronic display panel and is coupled to a second computing system, and wherein the second electronic display panel is angled towards the first electronic display panel to establish the fields of view;
    determining, using the processor, positional data within the fields of view for the object from the optical sensors when the object is within either the first display area or the second display area; and
    associating, using the processor, positional data within the first display area with input for the first electronic display panel and positional data within the second display area with input for the second electronic display panel, the input associated with the first electronic display panel is executed by the first computing system, and the input associated with the second electronic display panel is executed by the second computing system according to the positional data determined by the processor.

2. The method of claim 1, wherein the input is an executable instruction by the processor that performs a specific function on the computing system associated with either first electronic display panel or the second electronic display panel.

3. The method of claim 1, wherein the second electronic display panel does not include a sensor for enabling touchscreen functionality.

4. A system comprising:
    a first display panel coupled to a first computing system;
    a second display panel coupled to a second computing system in communication with the first computing system, wherein the second display panel is physically separated from the first display panel and angled towards the first display panel; and
    two or more optical sensors disposed on the first display panel and coupled to the first computing system to detect an object within fields of view of the optical sensors, wherein the fields of view include a first display area immediately facing and within a programmed distance from the first display panel and a second display area immediately facing and within the programmed distance from the second display panel as established by the angle of the second display panel towards the first display panel,
    wherein the optical sensors and the first computing system are configured to determine positional data within the fields of view for the object when the object is within either the first display area or the second display area,
    wherein the first computing system associates positional data within the first display area with input for the first display panel and positional data within the second display area with input for the second display panel, the input associated with the first display panel is executed by the first computing system, and the input associated with the second display panel is executed by the second computing system according to the positional data determined by the first computing system.

5. The system of claim 4, wherein the second display panel does not include a sensor for enabling touchscreen functionality.

6. The system of claim 4, wherein the first display panel includes at least two three-dimensional optical sensors positioned on opposite sides of a front surface of the first display panel.

7. A non-transitory computer readable storage medium having stored executable instructions, that when executed by a processor connected to a first electronic display panel, cause the processor to:
    detect, via two or more optical sensors coupled to the processor and disposed on the first electronic display panel, the first electronic display panel and the processor being coupled to a first computing system, an object within fields of view of the optical sensors, wherein the fields of view include a first display area and a second display area, wherein the first display area is immediately facing and within a programmed distance from the first electronic display panel,
    wherein the second display area is immediately facing and within the programmed distance from a second electronic display panel the second electronic display panel is physically separated from the first electronic display panel and is coupled to a second computing system, and wherein the second electronic display panel is angled towards the first electronic display panel to establish the fields of view;
    determine, using the processor, positional data within the fields of view for the object from the optical sensors when the object is within either the first display area or the second display area; and associate, using the processor, positional data within the first display area with input for the first electronic display panel and positional data within the second display area with input for the second electronic display panel, the input associated with the first electronic display panel is executed by the first computing system, and the input associated with the second electronic display panel is executed by the second computing system according to the positional data determined by the processor.

* * * * *